(12) United States Patent
Tanizawa et al.

(10) Patent No.: US 8,583,794 B2
(45) Date of Patent: Nov. 12, 2013

(54) APPARATUS, METHOD, AND COMPUTER PROGRAM PRODUCT FOR REGISTERING USER ADDRESS INFORMATION

(75) Inventors: Yoshimichi Tanizawa, Kanagawa (JP); Naoki Esaka, Kanagawa (JP); Tsutomu Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1417 days.

(21) Appl. No.: 12/230,575

(22) Filed: Sep. 2, 2008

(65) Prior Publication Data

US 2009/0109963 A1    Apr. 30, 2009

(30) Foreign Application Priority Data

Oct. 31, 2007  (JP) .................................. 2007-283829

(51) Int. Cl.
| | |
|---|---|
| G06F 15/173 | (2006.01) |
| G06F 15/16 | (2006.01) |
| G06F 7/04 | (2006.01) |
| G06F 17/30 | (2006.01) |
| G06F 9/00 | (2006.01) |
| G11C 7/00 | (2006.01) |

(52) U.S. Cl.
USPC ................. 709/225; 709/227; 726/2; 726/12; 726/21

(58) Field of Classification Search
USPC ........................ 709/225; 726/2, 6, 7; 370/352
See application file for complete search history.

(56) References Cited

U.S. PATENT DOCUMENTS

| | | | | |
|---|---|---|---|---|
| 7,277,434 B2* | 10/2007 | Astarabadi et al. | ........... | 370/389 |
| 7,434,258 B2* | 10/2008 | Bajko et al. | ..................... | 726/21 |
| 7,539,189 B2* | 5/2009 | Sauter et al. | .................. | 370/389 |
| 7,555,108 B2* | 6/2009 | Sylvain | .................... | 379/207.02 |
| 7,623,518 B2* | 11/2009 | Faulk, Jr. | ...................... | 370/392 |
| 7,729,343 B2* | 6/2010 | Kodaka | ......................... | 370/352 |

(Continued)

FOREIGN PATENT DOCUMENTS

| | | |
|---|---|---|
| JP | 2006-067057 | 3/2006 |
| JP | 2006-352468 | 12/2006 |
| JP | 2007-206851 | 8/2007 |

OTHER PUBLICATIONS

Shankar, J.S.; Latha, M.M.; , "Troubleshooting SIP Environments," Integrated Network Management, 2007. IM '07. 10th IFIP/IEEE International Symposium on , vol., No., pp. 601-611, May 21, 2007—Yearly 25 2007 doi: 10.1109/INM.2007.374823 URL: http://ieeexplore.ieee.org/stamp/stamp.jsp?tp=&arnumber=4258575&isnumber=4258514.*

(Continued)

Primary Examiner — Saleh Najjar
Assistant Examiner — Feliciano Mejia
(74) Attorney, Agent, or Firm — Finnegan, Henderson, Farabow, Garrett & Dunner, L.L.P.

(57) ABSTRACT

The storage unit stores therein authentication IDs that are used for authentication of users and address information in association with one another. The authentication processing unit receives from a PC an authentication message that includes an authentication ID and is used for the authentication of the user of a communication terminal, and performs authentication on the user based on the received authentication message. The SIP address acquiring unit acquires from the storage unit address information that corresponds to the authentication ID included in the authentication message when the user is authenticated. The SIP address registering unit sends the SIP location server a registration request for registering the acquired address information as the address information of the user of the IP telephone terminal associated with the PC that transmits the authentication message.

19 Claims, 7 Drawing Sheets

(56) References Cited

U.S. PATENT DOCUMENTS

| | | | |
|---|---|---|---|
| 7,773,983 B2 * | 8/2010 | Takeda | 455/420 |
| 7,808,928 B2 * | 10/2010 | Kim et al. | 370/255 |
| 7,818,580 B2 * | 10/2010 | Bardsley et al. | 713/182 |
| 7,949,767 B2 * | 5/2011 | Jayadevan et al. | 709/228 |
| 8,010,994 B2 * | 8/2011 | Chow | 726/2 |

OTHER PUBLICATIONS

Tanizawa, U.S. Appl. No. 12/202,704, filed Sep. 2, 2008, entitled Terminal, Method, and Computer Program Product for Registering User Address Information.

* cited by examiner

| PORT NUMBER | DEVICE ADDRESS | 802.1X EAP ID | GRANT/DENIAL OF TRANSFER |
|---|---|---|---|
| 1 | 00000000AA01 | 00000000AA01 | GRANT |
| 1 | 00000000ZZ01 | Alice | GRANT |
| 2 | 00000000AA02 | 00000000AA02 | DENIAL |
| 3 | 00000000AA03 | 00000000AA03 | GRANT |

FIG.5

| 802.1X EAP ID | SIP ADDRESS (AoR) |
|---|---|
| Alice | alice@example.com |
| Bob | bob-work@example.com |

| DEVICE ADDRESS | IP ADDRESS |
|---|---|
| 00000000AA01 | 192.168.0.91 |
| 00000000AA02 | 192.168.0.92 |
| 00000000AA03 | 192.168.0.93 |

| PC PORT NUMBER/ DEVICE ADDRESS | IP TELEPHONE TERMINAL PORT NUMBER/DEVICE ADDRESS |
|---|---|
| 1/ 00000000ZZ01 | 2/ 00000000AA01 |
| 3/ 00000000ZZ04 | 4/ 00000000AA02 |

APPARATUS, METHOD, AND COMPUTER PROGRAM PRODUCT FOR REGISTERING USER ADDRESS INFORMATION

CROSS-REFERENCE TO RELATED APPLICATIONS

This application is based upon and claims the benefit of priority from the prior Japanese Patent Application No. 2007-283829, filed on Oct. 31, 2007; the entire contents of which are incorporated herein by reference.

BACKGROUND OF THE INVENTION

1. Field of the Invention

The present invention relates to an apparatus, a method, and a computer program product for registering address information of users who use an IP telephone function with a server apparatus.

2. Description of the Related Art

Network access authentication protocols such as the Institute of Electrical and Electronic Engineers (IEEE) 802.1X and the Protocol for Carrying Authentication for Network Access (PANA) are widely known as protocols used for granting access to a certain network system to authenticated terminals only.

In accordance with the IEEE 802.1X standard (hereinafter, "802.1X authentication"), port-based authentication and access grant is conducted onto a connected device. The 802.1X authentication is usually conducted between an infrastructure switch and a device directly connected to the switch.

JP-A 2006-352468 (KOKAI) suggests a technology of granting access to all the terminals that are connected by way of a switch or the like to a port that satisfies the IEEE 802.1X standard, by providing the 802.1X authentication to any one of the terminals.

JP-A 2006-67057 suggests a technology of providing individual terminals with the 802.1X authentication and access grant based on their MAC addresses when multiple terminals are connected to a port that satisfies the IEEE 802.1X standard by way of a switch or the like.

Recently, an IP telephone system has been widely known in which a telephone network is realized on the IP network by use of Session Initiation Protocol (SIP). The SIP is a signaling procedure positioned between communication devices to control and relay communications. IP telephone terminals used in the IP telephone system are cabled by Ethernet or the like, and the telephone system is realized by SIP-based call control and media transfer on the IP network.

When a user starts using an IP telephone terminal, the user's SIP address needs to be registered with the IP telephone terminal. The SIP address registration is a process of associating the SIP address of the user with the SIP address of the IP telephone terminal. In this process, the user inputs an authentication ID, password and the like to the IP telephone terminal. The SIP address registering process has to be performed so that incoming calls for the user can be accurately received, callers can be accurately identified, and extended functions of the IP telephone terminal (such as abbreviated dialing) can be set up for each user. For the sake of users' convenience, the setting may be established to allow for incoming and outgoing calls without requesting the user to input an authentication ID or password, assuming that the SIP addresses have been registered for the default user.

An office-use IP telephone terminal often incorporates therein a switching unit provided with an uplink and a downlink to simplify the cabling around the desk. In particular, the uplink of the IP telephone terminal is connected to the port of the infrastructure switch, and the downlink of the IP telephone terminal is connected to a regular PC or the like. With such connections, the IP telephone terminal and the PC can be used with a port assigned to each desk.

In a free-address office or the like in which desks are not assigned to individual users in a fixed manner, only IP telephone terminals are placed on desks in a fixed manner to be connected to an infrastructure network. Then, a user makes a connection to the infrastructure network by way of the IP telephone terminal from a portable notebook PC or the like that is assigned to each individual. For this reason, the user has to have the connected PC authenticated and also to register a SIP address with the IP telephone terminal to which the PC is connected.

However, in the environment where a PC is connected to the infrastructure network by way of an IP telephone terminal, the SIP address registration has to be conducted on the IP telephone terminal, separately from the authentication conducted on the PC. This complicates the operation of using the IP telephone terminal.

More specifically, when the user wishes to use an IP telephone terminal and a PC at a desk on which the IP telephone terminal is placed, the user has to (1) connect the PC to the downlink of the IP telephone terminal; (2) initiate the 802.1X authentication on the infrastructure network from the connected PC to obtain access grant; and (3) register the SIP address of the user by operating the IP telephone terminal.

SUMMARY OF THE INVENTION

According to one aspect of the present invention, a relay apparatus that is connected by way of a network to a server apparatus, with which address information of a user of an IP telephone terminal is registered, and relays communications of a communication terminal and the IP telephone terminal with the network, the relay apparatus includes a first storage unit that stores an authentication ID used for authentication of a user of the communication terminal and the address information of the user of the IP telephone terminal in association with each other; an authentication processing unit that receives from the communication terminal an authentication message that includes the authentication ID and is used in the authentication of the user of the communication terminal, and authenticates the user based on the received authentication message; a user address acquiring unit that acquires from the first storage unit the address information of the user of the IP telephone terminal corresponding to the authentication ID included in the authentication message, when the user of the communication terminal is authenticated; and an address registering unit that sends a registration request of registering the acquired address information to the server apparatus as the address information of the user of the IP telephone terminal associated with the communication terminal that transmits the authentication message.

According to another aspect of the present invention, an address registering method executed in a relay apparatus that is connected by way of a network to a server apparatus, with which address information of a user of an IP telephone terminal is registered, relays communications of a communication terminal and the IP telephone terminal with the network, and includes a first storage unit that stores an authentication ID used for authentication of a user of the communication terminal and the address information of the user of the IP telephone terminal in association with each other, the address registering method includes receiving from the communication terminal an authentication message that includes the authentication ID and is used in the authentication of the user of the communication terminal; authenticating the user based on the received authentication message; acquiring from the first storage unit the address information of the user of the IP telephone terminal corresponding to the authentication ID included in the authentication message, when the user of the communication terminal is authenticated; and sending a registration request of registering the acquired address information to the server apparatus as the address information of the user of the IP telephone terminal associated with the communication terminal that transmits the authentication message.

A computer program product according to still another aspect of the present invention causes a computer to perform the method according to the present invention.

DETAILED DESCRIPTION OF THE INVENTION

Exemplary embodiments of an apparatus, a method, and a computer program product according to the present invention are explained in detail below with reference to the attached drawings.

A relay apparatus according to the first embodiment obtains a SIP address corresponding to an authentication ID that is used for the authentication when the user of the PC is successfully authenticated. The obtained SIP address is registered with a SIP location server as a SIP address of an IP telephone terminal used by the authenticated user.

In the following explanation, the IEEE 802.1X is adopted as an authentication protocol. However, an applicable authentication protocol is not limited thereto. For instance, the system may be configured to use the PANA, which is an access authentication technology that adopts the Extensible Authentication Protocol (EAP), in a similar manner to the IEEE 802.1X. In such a system, a PANA client (PaC) corresponds to the communication terminal, and a PANA authentication agent (PAA) corresponds to the relay apparatus.

Figure 1:
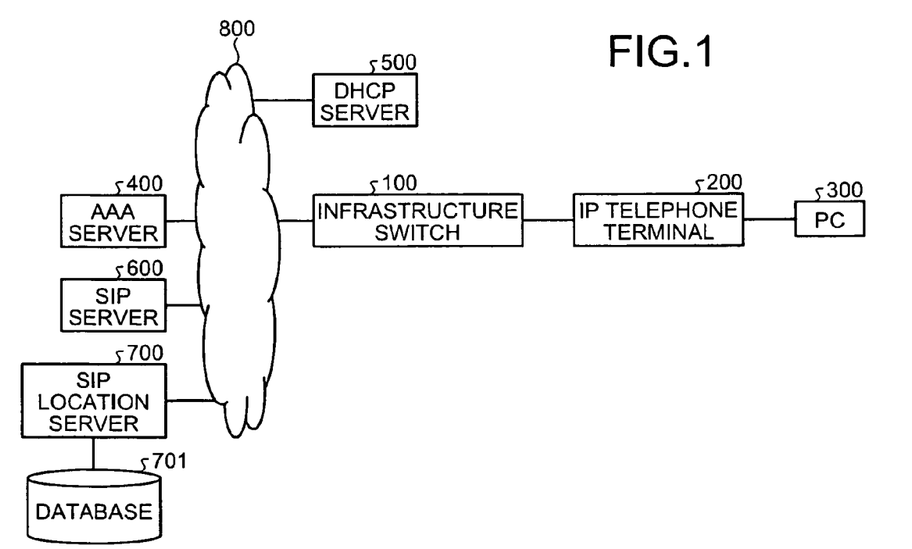
FIG. 1 is a diagram showing a network structure of an IP telephone system according to a first embodiment of the present invention.

As illustrated in FIG. 1, the IP telephone system according to the first embodiment includes an infrastructure switch 100, which serves as a relay apparatus, an IP telephone terminal 200, a PC 300, which serves as a communication terminal, an authentication, authorization, and accounting (AAA) server 400, a dynamic host configuration protocol (DHCP) server 500, which is an address control device, a SIP server 600, and a SIP location server 700. The infrastructure switch 100, the AAA server 400, the DHCP server 500, the SIP server 600, and the SIP location server 700 are connected to one another by way of an infrastructure network 800.

The infrastructure switch 100 is a switching device operated as a part of an office network infrastructure, which corresponds to an edge device connecting the PC 300 and the IP telephone terminal 200. The infrastructure switch 100 is provided with an IEEE 802.1X authenticator function to perform network access authentication on a connected terminal. The infrastructure switch 100 assigns a port to each desk space and provides it with an Ethernet cable.

According to the embodiment, the infrastructure switch 100 maintains the relationship between the PC 300 and the IP telephone terminal 200 that are connected to the same port. When the 802.1X authentication is performed on the PC 300 connected to the port, the infrastructure switch 100 performs the SIP address registration, which is necessary for the authenticated user of the PC 300 to use the IP telephone terminal 200 connected to the same port as the PC 300, in place of the IP telephone terminal 200.

The infrastructure switch 100 may be configured to perform the 802.1X authentication on the IP telephone terminal 200 in advance or to omit the 802.1X authentication on the IP telephone terminal 200. When it is omitted, the infrastructure switch 100 is configured to have the IP telephone terminal 200 and the PC 300 connected to the same port but individually provide them with connection settings and connection grant. Such an operation may be realized in accordance with the methods suggested in JP-A 2006-352468 (KOKAI) and JP-A 2006-67057 (KOKAI), for example.

The IP telephone terminal 200 provides a user who uses the desk space with an IP telephone function. The IP telephone terminal 200 uses the SIP for call control. The IP telephone terminal 200 includes a dialing unit and a headset (loudspeaker and microphone) to realize the functions of an ordinary telephone. In other words, the user obtains the functions similar to an ordinary telephone such as making a call by dialing a destination address by use of the dialing unit and receiving a call designating the IP telephone terminal 200 to make conversation by use of the headset. To use the following functions, however, the desk space user needs to register the user's SIP address by use of the dialing unit of the IP telephone terminal 200:

(1) Making a call with the address of the desk space user specified as a caller;

(2) Receiving a call designating the desk space user; and (3) Benefiting from IP telephone extended capabilities available for the desk space user (such as abbreviated dialing, voice mail setting, transfer setting for individual users, and call blocking setting for individual users).

The IP telephone terminal 200 includes an uplink and a downlink as connection interfaces with Ethernet (trademark). More specifically, the IP telephone terminal 200 has the uplink connected to the port of the infrastructure switch 100 and the downlink connected to the PC 300.

The PC 300 is a terminal that the user carries to the desk space and connects to the downlink of the IP telephone terminal 200. The user can use the network function by connecting the PC 300 to the downlink of the IP telephone terminal 200. To start using the network function, however, the 802.1X authentication needs to be performed between the PC 300 and the infrastructure switch 100 to obtain a network access grant. For this reason, the PC 300 is provided with an IEEE 802.1X supplicant function. When a connection is made between the PC 300 and the downlink of the IP telephone terminal 200, the user inputs his/her ID and password to execute the 802.1X authentication.

In FIG. 1, only one IP telephone terminal 200 and one PC 300 are illustrated. In a usual arrangement, however, multiple IP telephone terminals 200 and PCs 300 are connected to the infrastructure network 800 by way of the infrastructure switch 100. Hereinafter, a set of an IP telephone terminal 200 and a PC 300 may be simply referred to as a terminal.

The AAA server 400 holds authentication information of terminals and users, and implements the RADIUS protocol together with the infrastructure switch 100 when performing the 802.1X authentication on a terminal. The AAA server 400 holds information of SIP addresses (Addresses of Records) that is used when the user uses the IP telephone terminal 200, in addition to the authentication information associating authentication IDs and passwords of users for the 802.1X authentication.

The DHCP server 500 assigns IP addresses, which are necessary to use the network, to the PC 300 and the IP telephone terminal 200. When the 802.1X authentication is conducted at the infrastructure switch 100, an IP address can be assigned only when the target terminal is authenticated. The DHCP server 500 stores therein the correspondence of device addresses that identify different terminals, such as MAC addresses, and IP addresses assigned to the terminals.

The infrastructure switch 100 specifies a device address and supplies it to the DHCP server 500 so that information of an IP address assigned to the IP telephone terminal 200 having this device address can be obtained.

The SIP server 600 routes SIP messages that are necessary for the IP telephone terminal 200 to realize the SIP-based IP telephone function. The SIP server 600 acquires the SIP address correspondence that is necessary to make a call, by referring to the information managed by the SIP location server 700.

The SIP location server 700 holds the correspondence of SIP addresses necessary for the IP telephone terminal 200 to realize SIP-based calls. More specifically, the SIP location server 700 associates addresses of records (AoR's) with contact addresses and stores the data in a database 701 or the like. An AoR is a logical SIP address that identifies a user in the SIP system. A contact address is information that can specify an actual address of the terminal used by the user. The contact address is described as a combination of the information identifying the user and the IP address of the IP telephone terminal 200 used by the user with a symbol "@" interposed therebetween.

The correspondence of the SIP addresses may be registered with the SIP location server 700 by the SIP server 600 that has processed the SIP Register message, or any other registering method may be adopted. The infrastructure switch 100 according to the present embodiment is configured to directly access the SIP location server 700 to register the correspondence of the SIP addresses. The infrastructure switch 100 may be configured to send a SIP Register message to the SIP server 600 so that the SIP server 600 can conduct the SIP address registration.

The infrastructure network 800 connects the infrastructure switch 100, the AAA server 400, the DHCP server 500, the SIP server 600, and the SIP location server 700 to one another in a communicable manner. The infrastructure network 800 includes a regular router, a switch, and the like.

Figure 2:
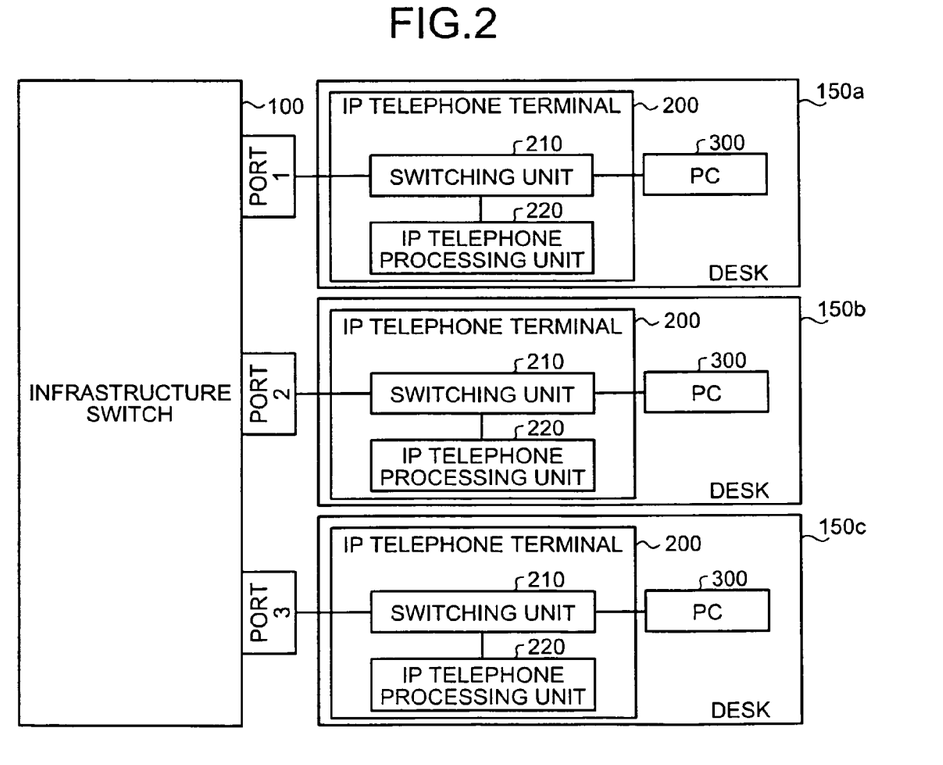
FIG. 2 is a diagram showing an example of a connection arrangement of IP telephone terminals.

The connection of the IP telephone terminals 200 is further explained below. FIG. 2 is a diagram showing an example of a connection arrangement of the IP telephone terminals 200 placed in desk spaces of an office. In this arrangement, the IP telephone terminals 200 are positioned on desks 150a to 150c. Portable PCs 300 that are individually assigned to the users are also positioned on the desks 150a to 150c.

Each of the IP telephone terminals 200 includes an IP telephone processing unit 220 that provides the IP telephone function, and a switching unit 210 that routes messages exchanged among the infrastructure switch 100, the IP telephone processing unit 220, and the PC 300 in accordance with the addresses of the messages. Each of the PCs 300 is connected to the infrastructure switch 100 by way of the switching unit 210.

Figure 3:
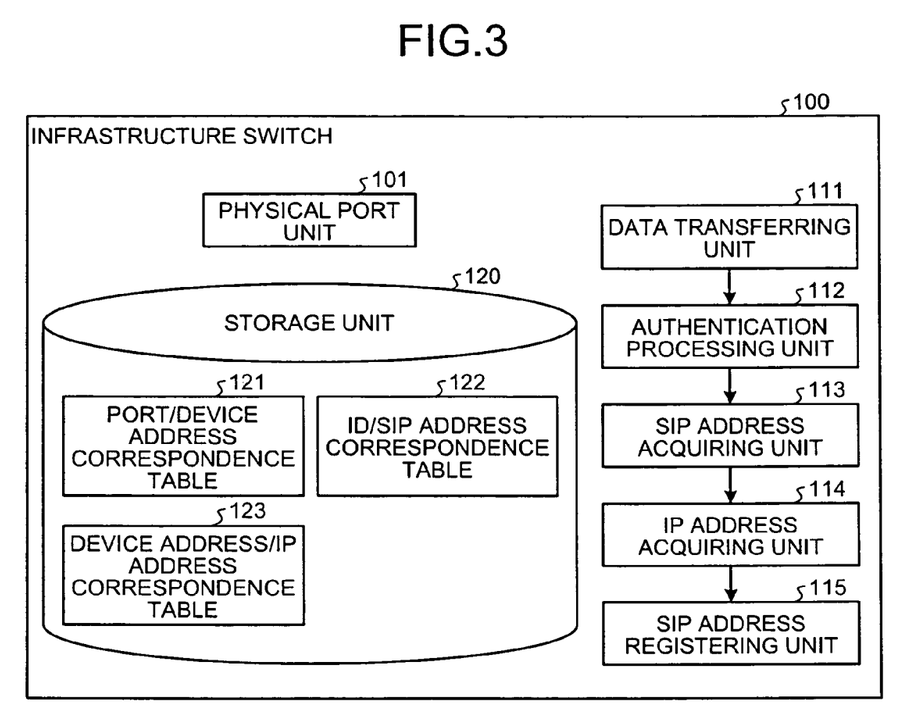
FIG. 3 is a block diagram showing a detailed structure of an infrastructure switch according to the first embodiment.

Next, the function and structure of the infrastructure switch 100 are explained in detail. As illustrated in FIG. 3, the infrastructure switch 100 includes a storage unit 120, a physical port unit 101, a data transferring unit 111, an authentication processing unit 112, a SIP address acquiring unit 113, an IP address acquiring unit 114, and a SIP address registering unit 115.

The storage unit 120 stores therein various kinds of information necessary for the SIP address registration. More specifically, the storage unit 120 stores therein a port/device address correspondence table 121, an ID/SIP address correspondence table 122, and a device address/IP address correspondence table 123. The storage unit 120 may be formed of any generally used memory medium such as a hard disk drive (HDD), an optical disk, a memory card, and a random access memory (RAM).

Figure 4:
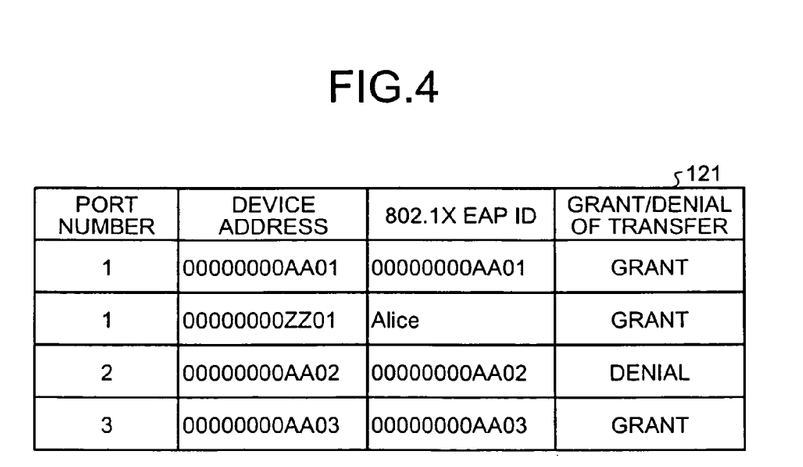
FIG. 4 is a diagram showing an example of a data structure of information stored in a port/device address correspondence table.

The port/device address correspondence table 121 contains the correspondence between device addresses and physical ports, and also the result of the 802.1X authentication obtained by the authentication processing unit 112. As shown in FIG. 4, the port/device address correspondence table 121 associates port numbers that identify the physical ports, device addresses, 802.1X EAP IDs, and grant/denial of transfer with one another and stores the data therein.

For a device address, the MAC address of the IP telephone terminal 200 or the PC 300 connected to the port of the corresponding port number is entered.

For a 802.1X EAP ID, an authentication ID included in an authentication message used in the 802.1X authentication is entered. When the IP telephone terminal 200 is authenticated, the MAC address of this IP telephone terminal 200 is entered as an authentication ID. When the PC 300 is authenticated, the user name or the like input by the user of this PC 300 for the authentication is entered as an authentication ID.

When the authentication processing unit 112 issues authentication, "grant" is entered for the grant/denial of transfer, while when the authentication processing unit 112 does not issue authentication, "denial" is entered.

By referring to this table, the data transferring unit 111 can identify the physical port through which data is to be transferred. At the same time, the data transferring unit 111 can determine whether data exchange with the terminal of the designated device address through the corresponding physical port is granted, also by referring to the table.

In FIG. 3, the ID/SIP address correspondence table 122 associates authentication IDs that different users adopt for the 802.1X authentication on the PC 300 with SIP addresses that those users adopt when using the IP telephone terminals 200, and stores the data therein.

Figure 5:
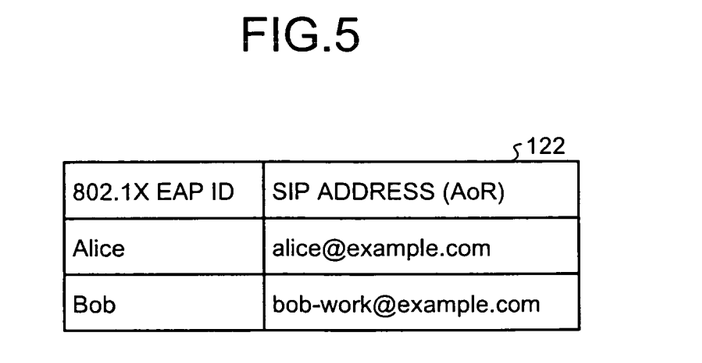
FIG. 5 is a diagram showing an example of a data structure of information stored in an ID/SIP address correspondence table.

As shown in FIG. 5, the ID/SIP address correspondence table 122 associates 802.1X EAP IDs, which are the authentication IDs adopted by the users of the PCs 300 for the 802.1X authentication with the SIP addresses (AoR) of the users. By referring to this table, the SIP address acquiring unit 113 obtains a SIP address that corresponds to a specific authentication ID.

The table may be set up in the infrastructure switch 100 in advance, or may be obtained from the AAA server 400 or any other server connected to the infrastructure network 800 by way of the SIP address acquiring unit 113.

Figure 6:
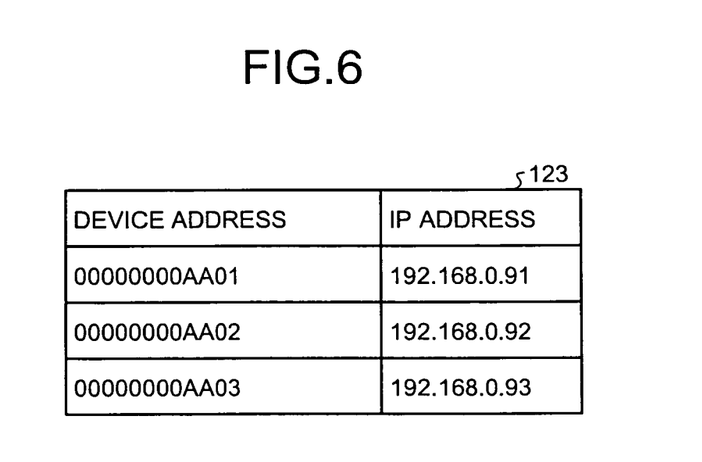
FIG. 6 is a diagram showing an example of a data structure of information stored in a device address/IP address correspondence table.

In FIG. 3, the device address/IP address correspondence table 123 associates the device addresses of the IP telephone terminals 200 connected to the infrastructure switch 100 with the IP addresses thereof, and stores the data therein. As shown in FIG. 6, the device addresses, which are the MAC addresses of the IP telephone terminals 200, and the IP addresses of the IP telephone terminals 200 are brought into association in the device address/IP address correspondence table 123.

In FIG. 3, the physical port unit 101 is a network interface that accepts the Ethernet cable connection to terminals such as the PCs 300 and the IP telephone terminals 200. When the 802.1X authentication is not made, the physical port unit 101 is not allowed to communicate with the terminal having the designated device address. When the 802.1X authentication is successfully made, the physical port unit 101 is allowed to communicate with the terminal of the designated device address. In addition, by specifying a certain port, the 802.1X authentication can be invalidated, and all the communications can thereby be set to either "grant" or "denial".

The data transferring unit 111 transfers data to realize communications between terminals or between a terminal and a server connected to the infrastructure network 800. In the data transfer, the data transferring unit 111 refers to the destination and source device addresses and determines a destination port to transfer the data. The data transferring unit 111 refers to the port/device address correspondence table 121 to determine the destination.

The authentication processing unit 112 performs the 802.1X authentication and determines whether the communications of the terminal having a certain device address through a certain physical port should be granted. During the authentication, the authentication processing unit 112 exchanges authentication information, if necessary, with the AAA server 400 connected to the infrastructure network 800, based on the RADIUS protocol.

Furthermore, the authentication processing unit 112 updates the port/device address correspondence table 121, the ID/SIP address correspondence table 122, and the device address/IP address correspondence table 123.

The SIP address acquiring unit 113 acquires a SIP address that corresponds to the authentication ID of the authenticated user from the ID/SIP address correspondence table 122. When there is no corresponding data in the ID/SIP address correspondence table 122, the SIP address acquiring unit 113 sends an inquiry about the SIP address corresponding to the authentication ID to the AAA server 400, and acquires the SIP address from the AAA server 400.

The SIP address acquiring unit 113 may be configured to acquire a SIP address corresponding to the authentication ID directly from the AAA server 400, without using the ID/SIP address correspondence table 122. In other words, when the 802.1X authentication is conducted on the PC 300, the SIP address acquiring unit 113 identifies the authentication ID used in the authentication and sends an inquiry about a SIP address corresponding to the identified authentication ID to the AAA server 400. Then, the SIP address acquiring unit 113 acquires the SIP address associated with the authentication ID from the AAA server 400 as a SIP address that is to be used when the user uses the IP telephone terminal 200. The server to which the inquiry is sent is not limited to the AAA server 400.

The IP address acquiring unit 114 sends an inquiry about an IP address that corresponds to the device address to the DHCP server 500, and acquires the IP address from the DHCP server 500. More specifically, when registering a SIP address of an IP telephone terminal 200, the IP address acquiring unit 114 identifies the device address of this IP telephone terminal 200, and sends an inquiry about an IP address that corresponds to the identified device address to the DHCP server 500 to acquire the IP address from the DHCP server 500. The IP address acquiring unit 114 associates the acquired IP address with the device address and stores the data in the device address/IP address correspondence table 123. The server to which the inquiry is sent is not limited to the DHCP server 500.

The SIP address registering unit 115 registers with the SIP location server 700 SIP addresses that the user needs when using the IP telephone terminal 200. More specifically, the SIP address registering unit 115 accesses the database 701 of the SIP location server 700, and requests that the user's AoR and the contact address that is usable on the IP telephone terminal 200 used by the user be registered in association with each other.

Figure 7:
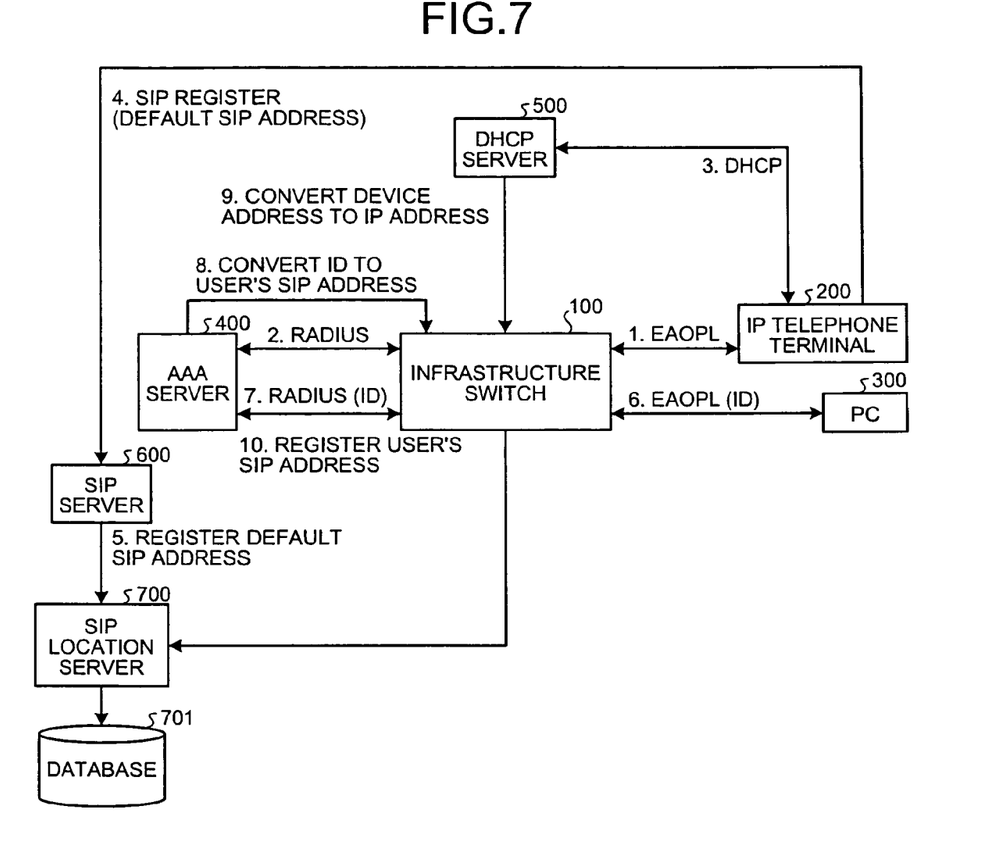
FIG. 7 is a diagram showing an overview of an IP telephone set-up process according to the first embodiment.

The overview of the IP telephone setting process according to the first embodiment is explained below with reference to FIG. 7. The IP telephone setting process is divided into an IP telephone terminal authenticating process (1 through 5 in FIG. 7) and a SIP address registering process (6 through 10 in FIG. 7). In the IP telephone terminal authenticating process, the IP telephone terminal 200 is authenticated in advance, and a default SIP address is registered. In the SIP address registering process, the user of the PC 300 is authenticated when the PC 300 is connected, and also a SIP address uniquely assigned to the authenticated user is registered.

First, the IP telephone terminal authenticating process is described ((1) to (5) below).

(1) The 802.1X authentication is conducted between the IP telephone terminal 200 and the infrastructure switch 100. This means that the IP telephone terminal 200 and the authentication processing unit 112 of the infrastructure switch 100 exchange EAPOL frames, which are the EAP authentication messages. The EAPOL frame sent by the IP telephone terminal 200 reaches the data transferring unit 111 of the infrastructure switch 100 by way of the physical port thereof.

The data transferring unit 111 refers to the port/device address correspondence table 121, and confirms that the IP telephone terminal 200 having the device address is not allowed to transfer data through the physical port. Then, the data transferring unit 111 transfers an EAPOL frame to the authentication processing unit 112. Thereafter, the authentication processing unit 112 exchanges the EAPOL frames with the IP telephone terminal 200.

(2) In the above situation, the authentication processing unit 112 executes the 802.1X authentication on the IP telephone terminal 200 by communicating with the AAA server 400, if necessary, based on the RADIUS protocol.

It is assumed here that the authentication ID of the IP telephone terminal 200 is the device address of the IP telephone terminal 200. This authentication ID is contained in the EAPOL frame to be used in the 802.1X authentication. When the authentication is successfully made, the authentication processing unit 112 allows the IP telephone terminal 200 having this device address to transfer data through the physical port. This means that the grant/denial of transfer is set to "grant" in the port/device address correspondence table 121.

(3) The IP telephone terminal 200 that is allowed in the 802.1X authentication to transmit and receive data in an ordinary manner sends an IP address assignment request to the DHCP server 500 via the infrastructure switch 100. In response, the DHCP server 500 assigns an IP address to the IP telephone terminal 200. The DHCP server 500 associates the assigned IP address with the device address of the IP telephone terminal 200 and stores the data therein.

(4) At this moment, the SIP address of the IP telephone terminal 200 has not yet been registered, and thus the user is not allowed to use the IP telephone function in principle. However, a default SIP address that enables the user to use the minimum IP telephone function may be registered as soon as the connection to the infrastructure network 800 is completed. This allows the user to use the IP telephone terminal 200 even before a SIP address of a specific user is registered with respect to the IP telephone terminal 200.

More specifically, the IP telephone terminal 200 exchanges SIP Register messages with the SIP server 600 by way of the infrastructure switch 100 to register the default SIP address. For the AoR registered as the default SIP address, the value uniquely given to each IP telephone terminal 200, such as the device address, may be adopted. For the contact address registered as the default SIP address, the IP address assigned to the IP telephone terminal 200 may be adopted.

(5) To register the default SIP address, the SIP server 600 registers the pair of SIP addresses (the AoR and the contact address) with the SIP location server 700 in accordance with the exchanged SIP Register messages. This pair of SIP addresses is stored in the database 701 of the SIP location server 700.

The sequence from (1) to (5) is completed before the user starts using the PC 300. When the setting of the infrastructure switch is that the 802.1X authentication of the IP telephone terminal is not executed, the 802.1X sequence of (1) and (2) is omitted. When the default SIP address registration is not to be performed, the default SIP address registration sequence of (4) and (5) is omitted. At the timing of the user connecting the PC 300 to the infrastructure switch 100, the following SIP address registering process ((6) through (10)) is initiated.

(6) First, the user connects the PC 300 to the infrastructure switch 100. Then, the 802.1X authentication is executed between the PC 300 and the infrastructure switch 100. This means that the PC 300 and the authentication processing unit 112 of the infrastructure switch 100 exchange EAPOL frames. The EAPOL frame sent by the PC 300 reaches the data transferring unit 111 through the physical port of the infrastructure switch 100.

The data transferring unit 111 refers to the port/device address correspondence table 121 and confirms that the PC 300 having the target device address is not allowed to transmit data through the physical port. Then, the data transferring unit 111 transfers the EAPOL frame to the authentication processing unit 112. Thereafter, the authentication processing unit 112 exchanges EAPOL frames with the PC 300.

(7) At this moment, the authentication processing unit 112 may conduct RADIUS protocol-based communications with the AAA server 400, if necessary, to executes the 802.1X authentication on the PC 300.

The authentication ID of the PC 300 is an ID assigned to the user, such as the user name. Such an authentication ID is contained in the EAPOL frame and used in the 802.1X authentication. When the authentication is successfully made, the authentication processing unit 112 allows the PC 300 having the target device address to send data through the physical port. This means that the grant/denial of transfer is set to "grant" in the port/device address correspondence table 121.

(8) When the authentication of the PC 300 is successfully made, the SIP address acquiring unit 113 acquires a SIP address that corresponds to the authentication ID used in the authentication of the PC 300 from the ID/SIP address correspondence table 122. When the SIP address fails to be acquired, the SIP address acquiring unit 113 sends the AAA server 400 an inquiry about the SIP address that is adopted by the user having the authentication ID to use the IP telephone terminal 200. The authentication ID used for the authentication can be acquired from the port/device address correspondence table 121.

The authentication ID and the SIP address acquired from the AAA server 400 in response to the inquiry are stored in the ID/SIP address correspondence table 122. Where to send the inquiry about the SIP address is not limited to the AAA server 400. The inquiry may be sent to any server other than the AAA server 400.

(9) Next, the IP address acquiring unit 114 refers to the port/device address correspondence table 121 and acquires the device address of the IP telephone terminal 200 related to the PC 300 the user of which is authenticated. More specifically, the IP address acquiring unit 114 acquires the device address of the IP telephone terminal 200 that corresponds to the same port number as the device address of the PC 300 of the authenticated user corresponds to, from the port/device address correspondence table 121.

Then, the IP address acquiring unit 114 sends the DHCP server 500 an inquiry about the IP address assigned to the IP telephone terminal 200 by use of the acquired device address. The acquired device address and the IP address acquired in response to the inquiry are stored in the device address/IP address correspondence table 123. The method of sending the inquiry about the IP address is not limited to an inquiry to the DHCP server 500. A conventional method, such as a method incorporating the Reverse Address Resolution Protocol (RARP), may be adopted.

(10) Finally, the SIP address registering unit 115 registers the SIP address acquired in (8) as an AoR and an address generated from the IP address acquired in (9) as a contact address. The acquired SIP address corresponds to the authentication ID of the authenticated user of the PC 300 and is stored in the ID/SIP address correspondence table 122. The acquired IP address is obtained by searching through the device address/IP address correspondence table 123. The method of generating the contact address will be explained later.

The SIP address registering unit 115 directly accesses the SIP location server 700 to register the SIP addresses. The SIP location server 700 stores the requested pair of SIP addresses (the AoR and the contact address) in the database 701.

In the 802.1X authentication, the authentication period during which the authentication is valid is preset in the storage unit 120 of the infrastructure switch 100 or the AAA server 400. The authentication processing unit 112 executes re-authentication after every preset authentication period. In accordance with the SIP, the SIP address registration valid period can be set up. For example, when a SIP address is registered based on a SIP Register message, the valid period can be set with an "expires" parameter, which is a "Contact Header" parameter.

Thus, the SIP address registering unit 115 may be configured to execute the SIP address registration in such a manner that the SIP address registration valid period is adjusted to agree with the IEEE 802.1X authentication period. In this manner, the SIP address valid period can be terminated when the authentication period of the PC 300 expires, even if, for example, the user leaves the desk space with the PC 300 without logging off.

Furthermore, when the PANA or the like is adopted as an authentication protocol, the re-authentication period may be determined in advance through negotiations between the PC 300 and a PANA authentication agent. The SIP address registering unit 115 can still designate the same value for the SIP address registration valid period as the determined re-authentication period when the authentication of the PC 300 is successfully made.

With the above sequence (1) through (10), when the user connects the PC 300 to the system by way of the IP telephone terminal 200 and operates the PC 300 to complete the network access authenticating process for the PC 300, the SIP address registering process necessary for the user to use the IP telephone terminal 200 is also completed. This simplifies the operation required of the user to start using the PC 300 and the IP telephone terminal 200.

When an EAPOL-Logoff message that notifies the expiration of the user authentication is received from the PC 300, the authentication processing unit 112 terminates the 802.1X authentication of the PC 300. Then, a network access from the PC 300 is no longer allowed, in the same manner as the state before being authenticated.

As mentioned before, the authentication processing unit 112 performs re-authentication of the PC 300 at regular intervals designated by an IEEE 802.1X re-authentication timer. Thus, when the PC 300 fails to be re-authenticated, the authentication processing unit 112 terminates the 802.1X authentication of this PC 300. Then, the network access from this PC 300 is no longer allowed in the same manner as the state before being authenticated.

When the 802.1X authentication of the PC 300 is terminated upon receipt of an EAPOL-Logoff message or due to failure of the re-authentication, the SIP address registering unit 115 deletes the corresponding SIP addresses from the SIP location server 700. More specifically, the SIP address registering unit 115 identifies the pair of registered SIP addresses based on the authentication ID of the user of the PC 300 whose authentication is expired and the IP address of the IP telephone terminal 200 associated with the PC 300. Then, the SIP address registering unit 115 directly accesses the SIP location server 700 and issues a request of deleting the identified SIP address pair to the SIP location server 700.

In this manner, the process of deleting the SIP addresses can be executed to terminate the use of the IP telephone terminal 200 at the same timing of the user logging off the PC 300.

Figure 8:
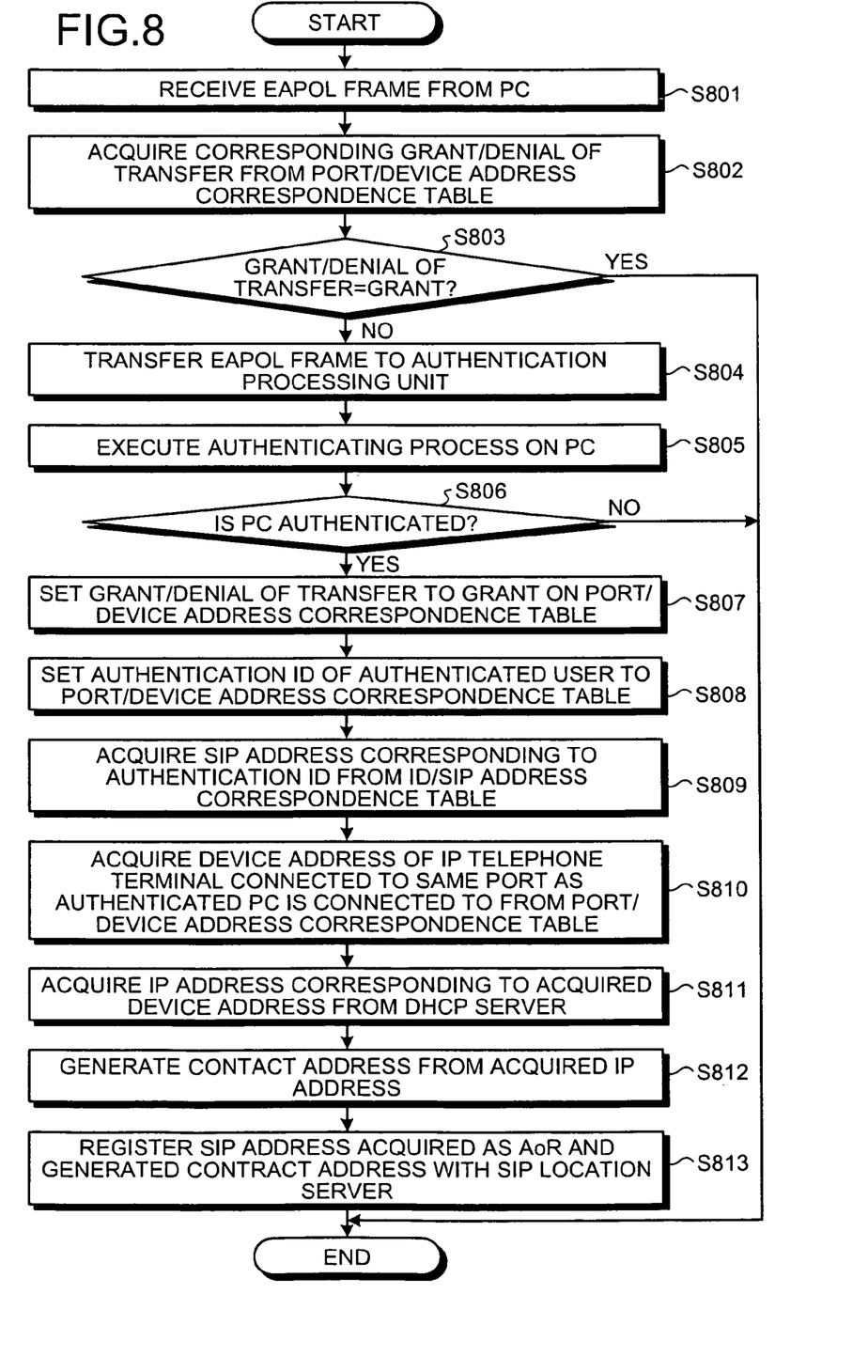
FIG. 8 is a flowchart of the entire SIP address registering process according to the first embodiment.

The SIP address registering process performed by the infrastructure switch 100 in the structure according to the first embodiment is explained in detail below with reference to FIG. 8.

First, the data transferring unit 111 receives an EAPOL frame from the PC 300 (step S801). Next, the data transferring unit 111 obtains from the port/device address correspondence table 121 a grant/denial of data transfer to the physical port through which the frame is received and to the device address of the sender of the frame (step S802).

Next, the data transferring unit 111 determines whether the transfer is granted (step S803). When it is granted (yes at step S803), the SIP address registering process is terminated.

When the transfer is not granted, or in other words when it is denied (no at step S803), the data transferring unit 111 transfers the received EAPOL frame to the authentication processing unit 112 (step S804).

The authentication processing unit 112 exchanges EAPOL frames with the PC 300, and has communications with the AAA server 400 based on the RADIUS protocol to execute the 802.1X authentication of the PC 300 (step S805).

Next, the authentication processing unit 112 determines whether the PC 300 is authenticated (step S806). When it is not authenticated (no at step S806), the SIP address registering process is terminated.

When the PC 300 is authenticated (yes at step S806), the authentication processing unit 112 sets the transfer to the authenticated PC 300 to "grant" on the port/device address correspondence table 121 (step S807). Furthermore, the authentication processing unit 112 enters the authentication ID of the authenticated user in the 802.1X EAP ID field of the port/device address correspondence table 121 (step S808).

Next, the SIP address acquiring unit 113 acquires a SIP address corresponding to the authentication ID of the authenticated user from the ID/SIP address correspondence table 122 (step S809). For example, when data as indicated in FIG. 5 is stored in the ID/SIP address correspondence table 122 and when the user's authentication ID is "Alice", the SIP address acquiring unit 113 obtains a SIP address corresponding to "Alice", "alice@example.com".

Thereafter, the IP address acquiring unit 114 acquires the device address of the IP telephone terminal 200 associated with the same port number as the port number to which the device address of the authenticated PC 300 from the port/device address correspondence table 121 corresponds (step S810). For example, when data as shown in FIG. 4 is stored in the port/device address correspondence table 121 and when the device address of the PC 300 is "00000000ZZ01", the IP address acquiring unit 114 acquires the device address "00000000AA01" that corresponds to the same port number as the port number corresponding to the device address of the PC 300, which is the port number "1".

Then, the IP address acquiring unit 114 acquires an IP address corresponding to the acquired device address from the DHCP server 500 (step S811). The IP address acquiring unit 114 stores the acquired IP address in the device address/IP address correspondence table 123. For example, when "192.168.0.91" is obtained from the DHCP server 500 as the IP address corresponding to the device address=00000000AA01, the IP address acquiring unit 114 stores a record such as shown at the top of FIG. 6 in the device address/IP address correspondence table 123.

Next, the SIP address registering unit 115 generates a contact address from the obtained IP address (step S812). For example, the SIP address registering unit 115 generates a contact address by adding the symbol "@" and the obtained IP address to the user part of the AoR, which is the SIP address obtained by the SIP address acquiring unit 113 from the ID/SIP address correspondence table 122.

Thereafter, the SIP address registering unit 115 issues a registration request to the SIP location server 700 to request the registration of a SIP address pair including the AoR, which is the SIP address obtained from the ID/SIP address correspondence table 122, and the generated contact address (step S813). The SIP address registering process is then terminated.

In the above structure, the IP telephone terminal 200 and the PC 300 placed on the same desk 150 are connected to the same port, and the IP telephone terminal 200 associated with the PC 300 is identified based on the fact that the same port is used. The method of identifying the associated IP telephone terminal 200 is not limited thereto, however, and any other identifying method can be adopted. For example, information associating the PC 300 with an IP telephone terminal 200 that is connected to a different port may be stored in a certain table, and the associated terminal may be identified with reference to this information.

Figure 9:
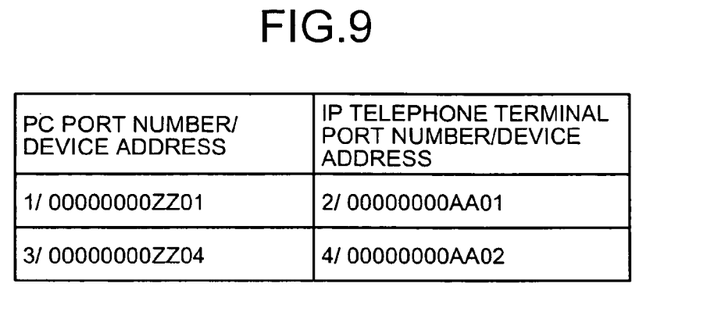
FIG. 9 is a diagram showing an example of a terminal correspondence table referred to in a modification of the first embodiment.

As shown in FIG. 9, the terminal association table associates port numbers/device addresses of PCs with port numbers/device addresses of IP telephone terminals and stores the data therein.

The PCs 300 and the IP telephone terminals 200 can be freely associated by this table. The table also enables an IP telephone terminal 200 associated with a PC 300 to be searched for with the device address as a search key. The terminal association table may be stored in advance in the storage unit 120 of the infrastructure switch 100 or the like, or may be obtained from any other server (not shown) connected to the infrastructure network 800.

In the relay apparatus according to the first embodiment, when the authentication of the user of the PC is successfully made, a SIP address corresponding to the authentication ID used for the authentication can be acquired, and the acquired SIP address can be registered with the SIP location server as a SIP address of the IP telephone terminal used by the authenticated user. More particularly, when the user connects the PC to the system by way of the IP telephone terminal and operates this PC to complete the network access authenticating process, the SIP address registering process required of the user to use the IP telephone terminal is also completed. This simplifies the operation of registering address information that is required to use the IP telephone function of the IP telephone terminal.

The IP telephone system according to a second embodiment notifies the IP telephone terminal of the registered SIP address when the registration of the SIP address is completed.

Figure 10:
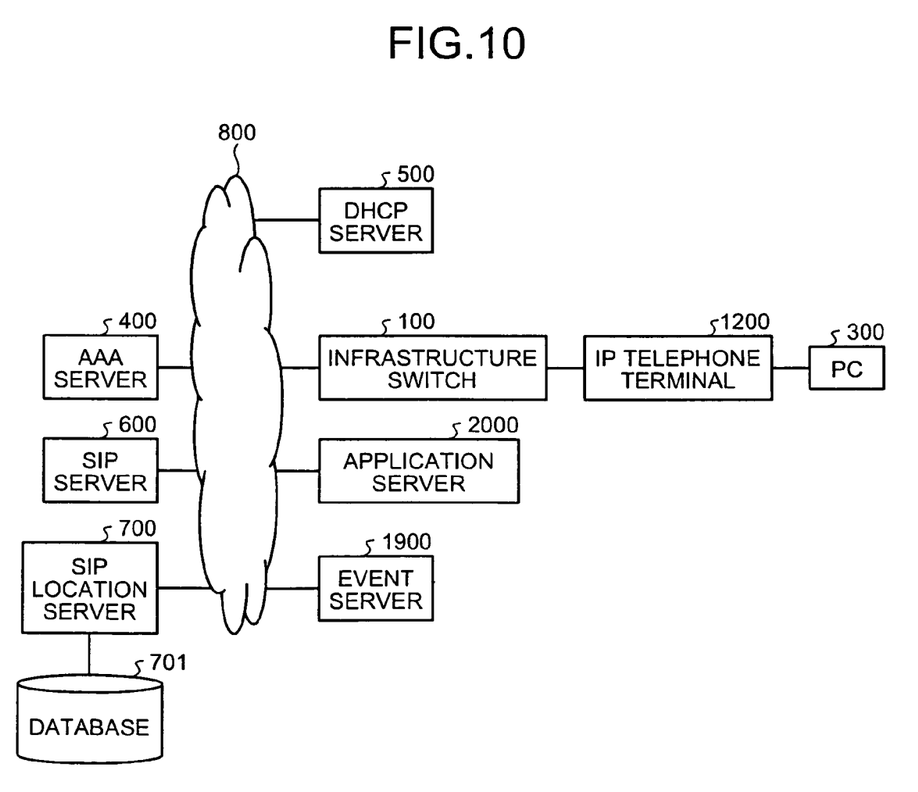
FIG. 10 is a diagram showing a network structure of an IP telephone system according to a second embodiment of the present invention.

As indicated in FIG. 10, the IP telephone system according to the second embodiment includes the infrastructure switch 100, an IP telephone terminal 1200, the PC 300, the AAA server 400, the DHCP server 500, the SIP server 600, the SIP location server 700, an event server 1900, and an application server 2000.

The structure according to the second embodiment is different from that of the first embodiment in that the event server 1900 and the application server 2000 are added, and that the IP telephone terminal 1200 has a function different from the counterpart of the first embodiment.

The event server 1900 monitors the database 701 of the SIP location server 700 and detects the registration of a new pair of SIP addresses as an event. The function of the event server 1900 can be realized in accordance with the method described in RFC 3680 (a Session Initiation Protocol (SIP) Event Package for Registrations).

The application server 2000 notifies the IP telephone terminal 1200 of the completion of the SIP address registration in accordance with the event detected by the event server 1900. More specifically, the application server 2000 first issues a subscription request to the event server 1900 so that the application server 2000 is notified of events when a certain SIP address is registered. When an event notification is received as requested, the application server 2000 sends a SIP message to the IP telephone terminal 1200 for which of a new SIP address is registered to notify the IP telephone terminal 1200 of the completion of the SIP address registration.

The IP telephone terminal 1200 receives the notification of the SIP address registration completion from the application server 2000 and executes a specific process in response to the notification. These features make the IP telephone terminal 1200 according to the second embodiment different from the IP telephone terminal 200 according to the first embodiment.

Figure 11:
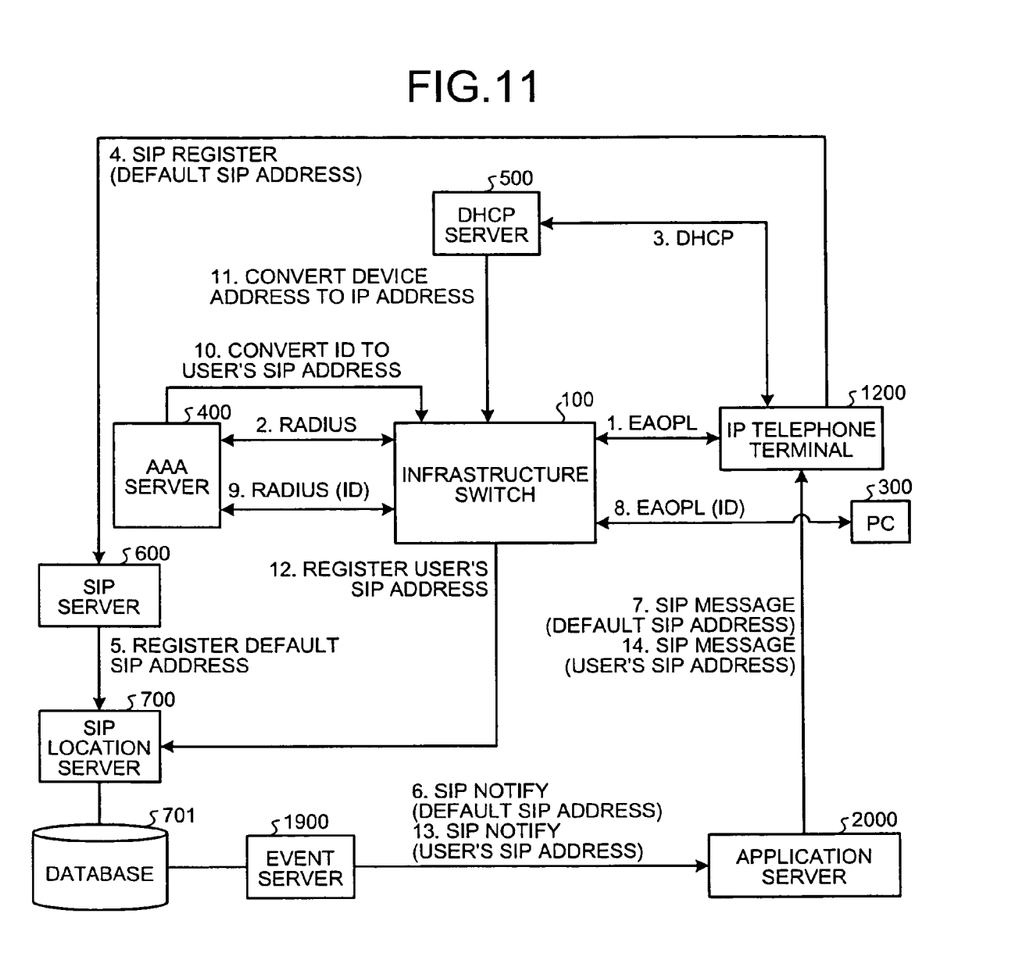
FIG. 11 is a diagram showing an overview of an IP telephone set-up process according to the second embodiment.

Next, an overview of the IP telephone setting process according to the second embodiment is provided with reference to FIG. 11.

According to the second embodiment, after the IP telephone terminal authenticating process (1 to 5 of FIG. 11) and the SIP address registering process (8 to 12 of FIG. 11), a notifying process (6 to 7 and 13 to 14 of FIG. 11) is added to notify the completion of the SIP address registration. This feature makes the second embodiment different from the first embodiment. In FIG. 11, the process of 6 to 7 is similar to the process of 13 to 14. In the following explanation, only the process of 13 to 14 is therefore discussed.

(13) When the registration of the SIP address is completed, the event server 1900 detects, as an event, that the SIP address of the IP telephone terminal 1200 has been registered. The event server 1900 sends a SIP Notify message to the application server 2000 that subscribes to this event to notify that the SIP address registration is completed. This notification includes a pair of registered SIP addresses.

(14) In response to the notification, the application server 2000 identifies the IP address of the IP telephone terminal 1200 for which the SIP address is registered based on the IP address which is a part of the contact address included in the notification. The application server 2000 sends a SIP message including information of the pair of registered SIP addresses (the AoR and the contact address) to the IP telephone terminal 1200 having the identified IP address to notify the completion of the SIP address registration.

The IP telephone terminal 1200 that receives this message may execute a specific process that is to be executed when the SIP address registration is completed. For example, the IP telephone terminal 1200 may display a welcome message on a liquid crystal display (LCD) or the like. Moreover, the IP telephone terminal 1200 may execute a process that reflects the setting information for each individual user corresponding to the AoR of a registered SIP address. The IP telephone terminal 1200 may be configured to download the setting information from the infrastructure network 800.

The IP telephone system according to the second embodiment notifies the registered SIP address to the IP telephone terminal when the registration of the SIP address is completed. With this structure, a necessary process is properly executed when the SIP address is registered.

Figure 12:
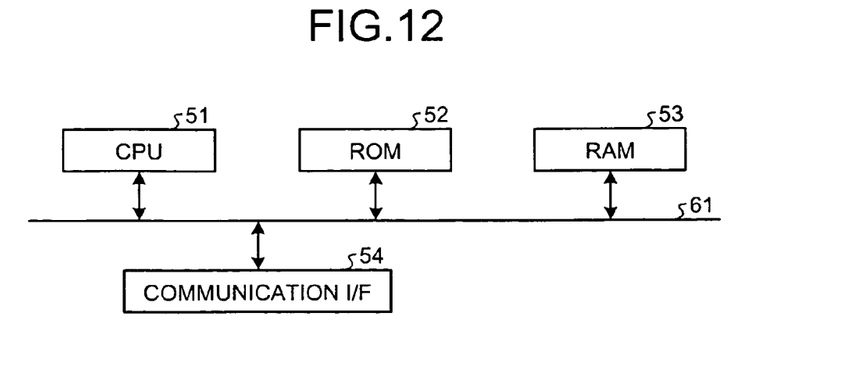
FIG. 12 is a diagram explaining a hardware structure of a relay apparatus according to the first or second embodiment.

The hardware structure of the relay apparatus according to the first and second embodiments is explained with reference to FIG. 12.

The relay apparatus according to the first and second embodiments includes a control device such as a central processing unit (CPU) 51, memory devices such as a read only memory (ROM) 52 and a RAM 53, a communication interface 54 connected to a network to conduct communications, and a bus 61 connecting these components to one another.

According to the first and second embodiments, an address registering program executed by the relay apparatus is installed in the ROM 52 or the like in advance.

According to the first and second embodiments, the address registering program executed by the relay apparatus may be stored in the form of an installable or executable file in a computer-readable recording medium such as a compact disk read only memory (CD-ROM), a flexible disk (FD), a compact disk recordable (CD-R), and a digital versatile disk (DVD).

According to the first and second embodiments, the address registering program executed by the relay apparatus may be stored in a computer connected to a network such as the Internet and downloaded via the network. Furthermore, according to the first and second embodiments, the address registering program executed by the relay apparatus may be provided or distributed via a network such as the Internet.

In the address registering program executed by the relay apparatus according to the first and second embodiments, the above units (the data transferring unit, the authentication processing unit, the SIP address acquiring unit, the IP address acquiring unit, and the SIP address registering unit) are formed as a module. As an actual hardware structure, the CPU 51 reads the address registration program from the ROM 52 and executes the program, and thereby the units are loaded and generated on the main storage device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A relay apparatus that is connected by way of a network to a server apparatus, with which address information of a user of a first terminal having an IP telephone function is registered, and relays communications of a second terminal and the first terminal with the network, the relay apparatus comprising:
    a first storage unit that stores an authentication ID used for authentication of a user of the second terminal and the address information of the user of the first terminal in association with each other;
    an authentication processing unit that receives from the second terminal an authentication message that includes the authentication ID and is used in the authentication of the user of the second terminal, and authenticates the user based on the received authentication message;
    a user address acquiring unit that acquires from the first storage unit the address information of the user of the first terminal corresponding to the authentication ID included in the authentication message, when the user of the second terminal is authenticated; and
    an address registering unit that sends a registration request of registering the acquired address information to the server apparatus as the address information of the user of the first terminal associated with the second terminal that transmits the authentication message.

2. The apparatus according to claim 1, further comprising:
    a port that connects the second terminal and the first terminal; and
    a second storage unit that stores a port number that identifies the port, and a second terminal ID that identifies the second terminal connected to the port having the port number or a telephone terminal ID that identifies the first terminal connected to the port having the port number, in association with each other, wherein
    the address registering unit acquires from the second storage unit the telephone terminal ID associated with the same port number with which the second terminal ID of the second terminal that transmits the authentication message is associated, and transmits to the server apparatus the registration request of registering the address information of the user of the first terminal having the acquired telephone terminal ID.

3. The apparatus according to claim 2, wherein the second terminal ID is a MAC address of the second terminal, and the telephone terminal ID is a MAC address of the first terminal.

4. The apparatus according to claim 2, further comprising a third storage unit that stores the second terminal ID and the telephone terminal ID in association with each other, wherein
    the address registering unit acquires from the third storage unit the telephone terminal ID associated with the second terminal ID of the second terminal that transmits the authentication message, and transmits to the server apparatus the registration request of registering the address information of the user of the first terminal having the acquired telephone terminal ID.

5. The apparatus according to claim 4, wherein the second terminal ID is a MAC address of the second terminal, and the telephone terminal ID is a MAC address of the first terminal.

6. The apparatus according to claim 1, wherein
    the authentication processing unit receives a notification message that notifies expiration of the authentication of the user of the second terminal, and terminates the authentication of the user based on the received notification message; and
    the address registering unit transmits to the server apparatus a deletion request of deleting from the server apparatus the acquired address information when the authentication of the user is expired.

7. The apparatus according to claim 1, wherein
    the server apparatus is capable of registering an effective period of the address information, and
    the address registering unit transmits to the server apparatus the registration request of registering with the server apparatus the acquired address information by adopting, for the effective period, a predetermined authentication period during which the authentication is effective.

8. The apparatus according to claim 7, wherein
    the authentication processing unit receives the authentication message including the authentication period and the authentication ID; and
    the address registering unit transmits to the server apparatus the registration request of registering the acquired address information with the server apparatus by adopting, for the effective period, the authentication period included in the received authentication message.

9. The apparatus according to claim 7, wherein
    the authentication processing unit re-authenticates the user having the authentication ID every time the authentication period elapses; and
    the address registering unit transmits to the server apparatus the registration request of registering the acquired address information with the server apparatus by adopting the authentication period for the effective period, when the user is re-authenticated.

10. The apparatus according to claim 9, wherein the address registering unit transmits to the server apparatus a deletion request of deleting from the server apparatus the acquired address information when the user is not re-authenticated.

11. The apparatus according to claim 1, wherein the authentication processing unit receives the authentication message in accordance with IEEE 802.1X from the second terminal and performs authentication on the user based on the received authentication message.

12. The apparatus according to claim 1, wherein the authentication processing unit receives the authentication message in accordance with PANA (Protocol for Carrying Authentication for Network Access) from the second terminal and performs authentication on the user based on the received authentication message.

13. The apparatus according to claim 1, further comprising a terminal address acquiring unit that acquires an IP address of the first terminal associated with the second terminal that transmits the authentication message, from an address management apparatus that is connected by way of the network and manages the IP address of the first terminal, wherein
the address registering unit transmits to the server apparatus the registration request of registering terminal identification information including the acquired IP address and capable of identifying the first terminal associated with the second terminal that transmits the authentication message, and the acquired address information, in association with each other.

14. The apparatus according to claim 1, wherein the user address acquiring unit acquires address information of the user of the first terminal corresponding to the authentication ID included in the authentication message, from a management apparatus that is connected by way of a network and manages the authentication ID and the address information of the user of the first terminal in association with each other.

15. The apparatus according to claim 14, wherein the management apparatus is an AAA server that executes an authenticating process in accordance with a predetermined Authentication, Authorization and Accounting (AAA) protocol; and
the user address acquiring unit acquires, from the AAA server, address information of the user of the first terminal corresponding to the authentication ID included in the authentication message, when the user of the second terminal is authenticated.

16. The apparatus according to claim 1, wherein the authentication processing unit authenticates the user of the authentication ID included in the authentication message with an AAA server that is connected to the network and executes the authentication process in accordance with a predetermined AAA protocol.

17. The apparatus according to claim 1, wherein the address information is an Address of Record (AoR) of a Session Initiation Protocol (SIP).

18. An address registering method executed in a relay apparatus that is connected by way of a network to a server apparatus, with which address information of a user of a first terminal having an IP telephone function is registered, relays communications of a second terminal and the first terminal with the network, and includes a first storage unit that stores an authentication ID used for authentication of a user of the second terminal and the address information of the user of the first terminal in association with each other, the address registering method comprising:
receiving from the second terminal an authentication message that includes the authentication ID and is used in the authentication of the user of the second terminal;
authenticating the user based on the received authentication message;
acquiring from the first storage unit the address information of the user of the first terminal corresponding to the authentication ID included in the authentication message, when the user of the second terminal is authenticated; and
sending a registration request of registering the acquired address information to the server apparatus as the address information of the user of the first terminal associated with the second terminal that transmits the authentication message.

19. A computer program product having a non-transitory computer readable medium including programmed instructions for relaying communications of a first terminal having an IP telephone function and a second terminal with a network, wherein the instructions, when executed by a computer including a first storage unit that stores an authentication ID used for authentication of a user of the second terminal and the address information of the user of the first terminal in association with each other, cause the computer to perform:
receiving from the second terminal an authentication message that includes the authentication ID and is used in the authentication of the user of the second terminal;
authenticating the user based on the received authentication message;
acquiring from the first storage unit the address information of the user of the first terminal corresponding to the authentication ID included in the authentication message, when the user of the second terminal is authenticated; and
sending a registration request of registering the acquired address information to the server apparatus for registering the address information as the address information of the user of the first terminal associated with the second terminal that transmits the authentication message.

* * * * *